(12) United States Patent
Tobias et al.

(10) Patent No.: US 6,981,050 B1
(45) Date of Patent: Dec. 27, 2005

(54) DIGITAL REMOTE RECORDER

(75) Inventors: Martin Tobias, Seattle, WA (US); Beverley Kite, Seattle, WA (US); Mathews Brown, Seattle, WA (US)

(73) Assignee: Loudeye Corp., Seattle, WA (US)

( * ) Notice: Subject to any disclaimer, the term of this patent is extended or adjusted under 35 U.S.C. 154(b) by 0 days.

(21) Appl. No.: 09/502,377

(22) Filed: Feb. 11, 2000

Related U.S. Application Data

(60) Provisional application No. 60/156,817, filed on Sep. 29, 1999, provisional application No. 60/120,208, filed on Feb. 11, 1999, provisional application No. 60/120,207, filed on Feb. 11, 1999, provisional application No. 60/120,209, filed on Feb. 11, 1999, provisional application No. 60/119,762, filed on Feb. 11, 1999, provisional application No. 60/120,206, filed on Feb. 11, 1999.

(51) Int. Cl.[7] ............................................. G06F 15/16
(52) U.S. Cl. ................ 709/231; 709/203; 709/218; 709/228; 709/233; 718/102; 718/103; 725/9; 725/25; 725/27; 725/31; 725/32; 725/35; 725/82; 725/97; 725/109; 345/401; 345/718; 345/719
(58) Field of Search ................ 709/102, 218, 709/228, 233, 231, 203; 370/316, 401; 345/718–719; 725/25, 27, 31, 36, 48, 49, 55, 82, 97, 101, 725/102, 109, 126, 3, 9, 35, 32; 455/132, 455/427

(56) References Cited

U.S. PATENT DOCUMENTS 5,629,732 A * 5/1997 Moskowitz et al. ........ 725/102
5,684,800 A * 11/1997 Dobbins et al. ............. 370/401
5,818,512 A * 10/1998 Fuller ........................... 725/82
5,920,701 A * 7/1999 Miller et al. ................ 709/228
5,940,504 A   8/1999 Griswold
5,941,951 A * 8/1999 Day et al. .................... 709/233
5,973,683 A * 10/1999 Cragun et al. .............. 345/719
6,326,982 B1 * 12/2001 Wu et al. ..................... 345/718
6,411,992 B1 * 6/2002 Srinivasan et al. .......... 709/218
6,459,427 B1 * 10/2002 Mao et al. ................... 725/109
6,526,575 B1 * 2/2003 McCoy et al. ................ 725/36
6,584,082 B1 * 6/2003 Willis et al. ................. 370/316
6,594,682 B2 * 7/2003 Peterson et al. ............ 709/102
6,732,183 B1 * 5/2004 Graham ....................... 709/231
2003/0135867 A1 * 7/2003 Guedalia ..................... 725/126

* cited by examiner

*Primary Examiner*—Saleh Najjar
*Assistant Examiner*—ThuHa Nguyen
(74) *Attorney, Agent, or Firm*—Pillsbury Winthrop Shaw Pittman LLP

(57) ABSTRACT

A method and system for recording and publishing traditional media source programs over a network is disclosed. According to the method, a request for publication of one or more traditional media source programs in one or more encoding formats is received from a network client that is connected to the network. In response to receiving the request, the one or more traditional media source programs are captured from a traditional media source that broadcasts the one or more traditional media source programs at a particular broadcast time. The one or more traditional media source programs are encoded in one or more encoding formats to produce one or more encoded media programs and then published to the network client over the network at a time that is different from the actual broadcast time.

23 Claims, 3 Drawing Sheets

DIGITAL REMOTE RECORDER

This patent application claims priority from:

U.S. Provisional Patent Application No. 60/120,206, filed on Feb. 11, 1999, entitled DIGITAL VCR;

U.S. Provisional Patent Application No. 60/119,762, filed on Feb. 11, 1999, entitled PRODUCTION SYSTEM FOR DIGITALLY ENCODING INFORMATION;

U.S. Provisional Patent Application No. 60/120,209, filed on Feb. 11, 1999, entitled MEDIA DISTRIBUTION SYSTEM;

U.S. Provisional Patent Application No. 60/120,207, filed on Feb. 11, 1999, entitled SYSTEM FOR REMOTE PERFORMANCE OF DIGITAL ENCODING;

U.S. Provisional Patent Application No. 60/120,208, filed on Feb. 11, 1999, entitled SYSTEM FOR HANDLING VOICE MAIL IN AN E-MAIL SYSTEM; and U.S. Provisional Patent Application No. 60/156,817, filed on Sep. 29, 1999, entitled STREAMING MEDIA ENCODING AGENT FOR TEMPORAL MODIFICATIONS;

the contents of which are hereby incorporated by reference in their entirety.

FIELD OF THE INVENTION

The present invention generally relates to computer systems, and more specifically to a mechanism for automatically recording and publishing traditional media source programs in streaming format.

BACKGROUND OF THE INVENTION

Viewers of television network programming may watch or record only a limited set of programs that are offered by the television networks. Subscribers of satellite television and cable television are provided a limited number of programs for viewing. Similarly, listeners of audio programs such as radio programs may wish to have certain programs recorded. The term "traditional media source programs" will be used hereafter to refer to video and audio programs obtained from traditional sources, including but not limited to television network programs, satellite, cable, video programs and audio programs.

As is often the case, viewers in a particular geographical location may want to watch or record traditional media source programs that are not available in the viewers' particular geographic location. For example, a viewer in San Francisco may want to view the local news program in New York City or in Kuala Lumpur, Malaysia. Similarly, a listener in San Francisco may want to record a radio program that is being broadcast.

However, the expense associated with broadcasting traditional media source programs throughout the world is prohibitive using such traditional broadcast methods as broadcasting stations, satellite and cable. Thus, there are currently no simple mechanisms for transceiving traditional television, satellite and cable signals to viewers throughout the world.

Based on the foregoing, it is clearly desirable to provide a mechanism for automatically recording and publishing traditional media source programs to a wider audience than is practical using conventional media dissemination techniques.

SUMMARY OF THE INVENTION

The present invention comprises, in one aspect, a method for recording and publishing traditional media source programs over a network, the method comprising the computer-implemented steps of receiving from a network client that is connected to the network a request for publication of one or more traditional media source programs in one or more encoding formats; in response to receiving the request, capturing the one or more traditional media source programs from a traditional media source that broadcasts the one or more traditional media source programs at a particular broadcast time; encoding the one or more traditional media source programs in the one or more encoding formats to produce one or more encoded media programs; and publishing, at a time different from said particular broadcast time, the one or more encoded media programs over the network to the network client.

The invention also encompasses a computer-readable medium, and an apparatus configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
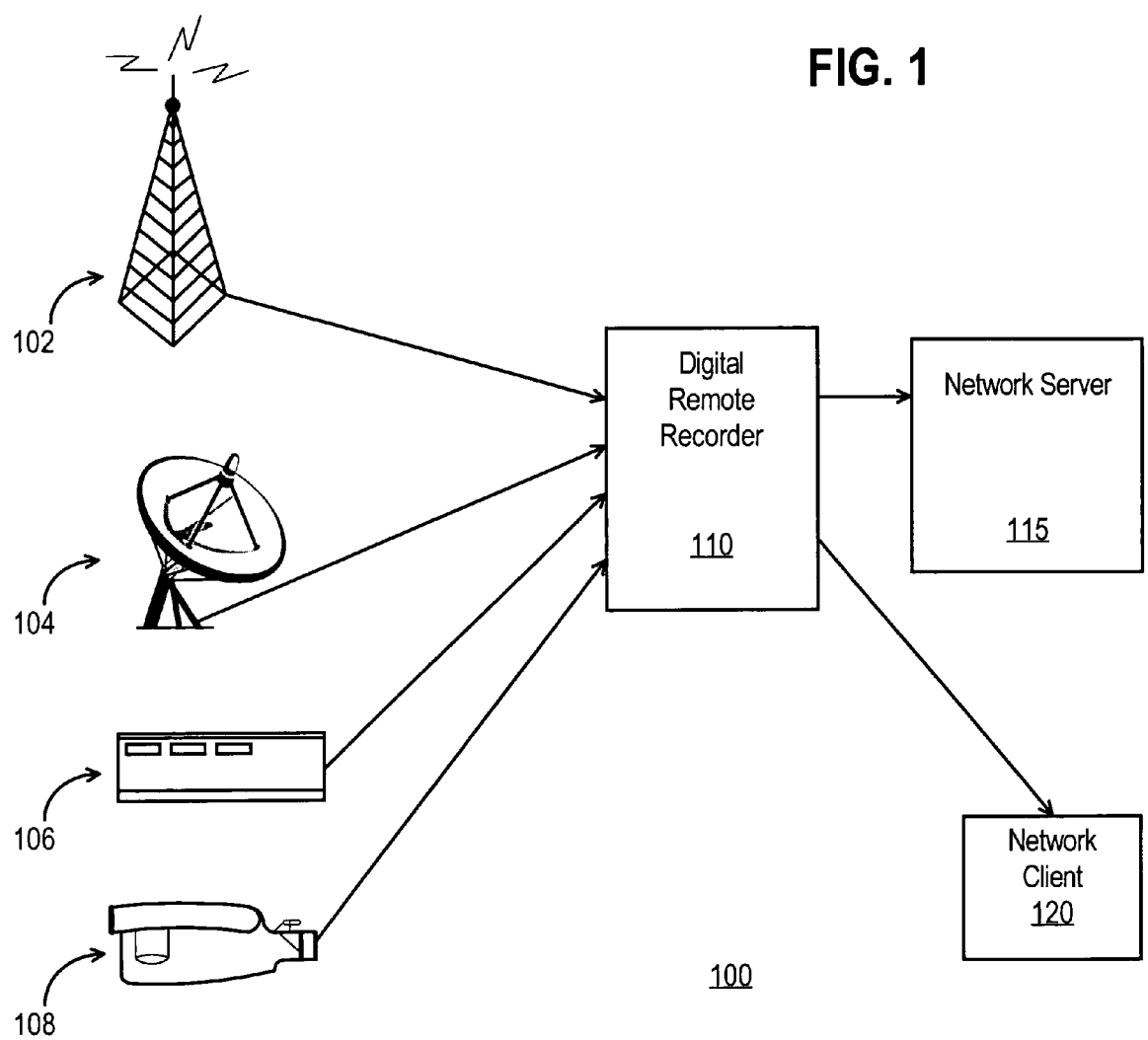
FIG. 1 is a block diagram of an automated recording and publishing system 100 in which certain embodiments of the invention may be used.

A mechanism for recording and publishing traditional media source programs is disclosed. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Context Overview

In one embodiment, a digital remote recorder mechanism is configured as a transceiver for capturing signals that embody traditional media source programs ("traditional media source signals") in digital format, producing encoded media programs and publishing the resulting encoded media programs on a network to viewers who request publication of the encoded media programs.

In one embodiment, traditional media source programs are care captured and encoded into streaming media format. A traditional media source program encoded in a streaming format is hereafter referred to as a "streaming media program". A streaming media program is a type of encoded media program. Streaming is a technique for transferring digital media in a steady and continuous stream that results in normal-speed playback when played by the recipient at the rate that the data is received. Because streaming media can be played at the rate that it is received, it is not necessary for users to first download a program before playing it. With streaming, a streaming media player such as RealNetworks Media player, is configured to play streaming media programs in almost real-time (there may be a short time delay) as the streams are received from a streaming media server. In one embodiment of the invention, traditional media source programs are care captured and encoded into non-streaming media format.

According to certain embodiments of the invention, a viewer who wishes to view traditional media source programs that are being broadcast in different parts of the world, may make an online request to a digital remote recorder mechanism to have those programs captured, encoded and eventually sent to the viewer's networked computer or networked receiver for encoded media programs. Thus, not only may a viewer view the programs at a later and more convenient time, the viewer now has access to traditional media source programs that are broadcast in different parts of the world. The act of receiving by a viewer encoded media programs at a time that is later than the time of broadcast of the corresponding to traditional media source programs is hereafter referred to as "publication of encoded media programs" or "publishing encoded media programs".

To illustrate, in one embodiment, a viewer may access, through the Internet, a web page associated with a particular digital remote recorder mechanism that is capable of capturing and encoding traditional media source programs in a particular geographic region or from a particular satellite or cable feed. When the viewer accesses the web page, the viewer may then select the traditional media source programs that he wishes to be published to the viewer's computer. The digital remote recorder mechanism may capture the selected traditional media source programs from a variety of sources that includes but is not limited to a live feed from an analog or digital camera, or from a particular satellite or cable feed. The digital remote recorder mechanism may then encode the captured traditional media source programs into a streaming format to produce streaming media programs. In one embodiment, the streaming media programs are stored at a streaming media network server. When the viewer is ready to receive a streaming media program at the viewer's network client, the streaming media network server streams (publishes) the streaming media program to the viewer's network client. In one embodiment, the viewer's interaction with the digital remote recorder mechanism may be through a remote network connection via the viewer's network client.

In one embodiment, a viewer who made the request for publication of encoded media programs is informed of the completion of the encoding process via e-mail or other similar mechanisms. In certain embodiments, when the viewer receives notification that the encoding is complete, the viewer also receives a URL link by which the viewer may access the streaming media programs. For example, in one embodiment, upon completion of an encoding process, the user receives an e-mail that includes a link to a streaming media program that was requested by the viewer. By selecting the URL link that is provided by the e-mail, the transmission of the streaming media program is initiated and the viewer may view the streaming media program. For non-streaming media programs, when the user receives an e-mail that includes a URL link to a non-streaming media program that was requested by the viewer, the viewer may download the non-streaming media program by selecting the URL link that provided in the e-mail.

In certain embodiments of the invention, when the traditional media source programs selected by the viewer are recorded and encoded, a URL link is added to a Web page associated with the viewer. When the viewer selects the URL link on the Web page, either the transmission of the streaming media program is initiated or the downloading of a non-streaming media program is initiated.

In certain embodiments, the viewer may pre-schedule a time for publication of the streaming media program to the viewer.

In one embodiment of the invention, publication of the streaming media program to the viewer occurs automatically and occurs as soon as the captured traditional media source programs have been encoded into a streaming format to produce streaming media programs.

Computer System Architecture

FIG. 1 is a block diagram of an automated recording and publishing system 100 in which certain embodiments of the invention may be used. Generally, the automated recording and publishing system 100 includes one or more traditional media sources such as a television broadcast station 102, a satellite feed 104, a cable television feed 106, and a digital video camera 108. System 100 also includes a digital remote recorder 110, a streaming media program Network server 115 and a Network client 120. In FIG. 1, the components of system 100 are connected through one or more network systems. These one or more network systems may include, but are not limited to, Local Area Networks (LAN), and Wide Area Networks (WAN), including the Internet. Thus, the automated recording and publication system allows each component to be separately located.

In FIG. 1, network client 120 represents a device, such as a personal computer, workstation, or other device that is capable of communicating with digital remote recorder 110. In one embodiment, network client 120 includes a browser application, such as Microsoft Internet Explorer® or Netscape Navigator®, that can request, receive and display electronic documents over a network connection. Thus, a viewer may interact with network client 120 to make requests for publication of encoded media programs to network client 120.

In one embodiment, digital remote recorder 110 is a computer, or one or more hardware or software components or processes that cooperate or execute in one or more computer systems. In one embodiment, digital remote recorder 110 is configured to respond to message requests that are received over a network from the network client, such as network client 120. Digital remote recorder 110 communicates interface data to network client 120 for displaying a user interface at the network client. The interface data may consist of electronic document information, such as HyperText Markup Language (HTML) or Extensible Markup Language (XML) page information. In one embodiment, the user interface data includes one or more interface templates that provide a user-friendly mechanism for entering viewer requests for publication of traditional media source programs ("encoding requests"). Each encoding request generally includes data that identifies the traditional media source programs that the viewer wants published in streaming format, and publication scheduling parameters for each publication. Thus, by interacting with the user interface provided by digital remote recorder 110, a viewer may readily create encoding requests for traditional media source programs.

For example, the user interface may be an HTML web page that contains an option for selecting traditional media source programs from any part of the world. Once the viewer selects one or more traditional media source programs, digital remote recorder 110 automatically causes the viewer's selected traditional media source programs to be captured.

Digital remote recorder 110 automatically performs the task of encoding the captured traditional media source programs. For example, in one embodiment, after digital remote recorder 110 has encoded the captured traditional media source programs into streaming media programs, digital remote recorder 110 stores the streaming media programs at network server 115 until the viewer who requested publication of the streaming media programs is ready to receive publication of the streaming media programs at the viewer's network client 120.

Capturing, Encoding And Publishing

Figure 2:
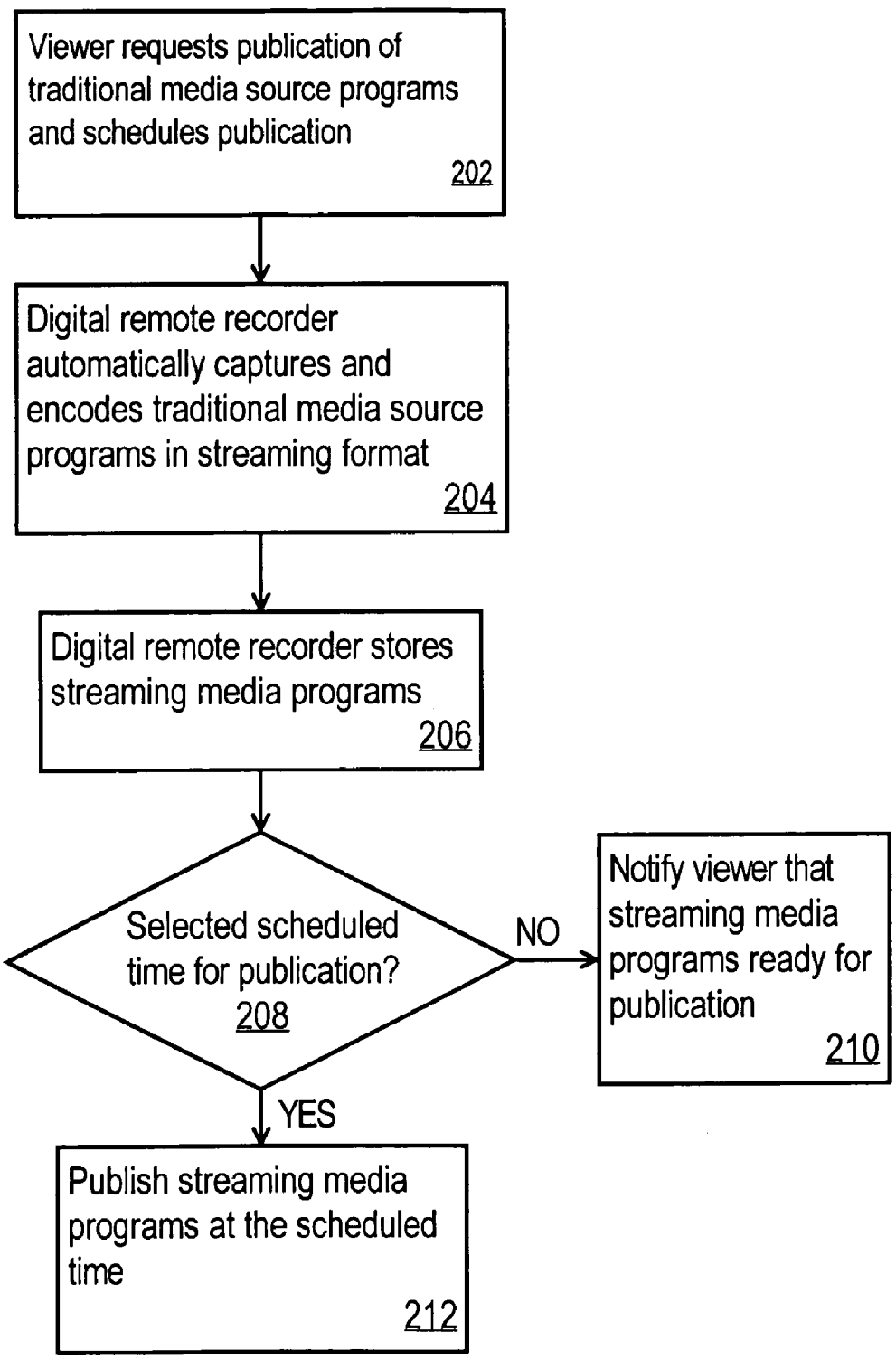
FIG. 2 is a flow diagram that illustrates an example of an automatic system for capturing traditional media source programs, and encoding such programs into corresponding streaming media programs and for eventual publication of the streaming media programs according to an embodiment of the invention.

FIG. 2 is a flow diagram that illustrates an example of a method for capturing traditional media source programs, encoding such programs into corresponding streaming media programs, and for eventual publication of the streaming media programs. For the purposes of explanation, the steps in FIG. 2 will be described with reference to the components of FIG. 1. As illustrated at block 202 of FIG. 2, a viewer makes a request for publication of one or more traditional media source programs by making an online connection over a network, for example the Internet, to a digital remote recorder 110, via network client 120. The viewer may have the option of scheduling a particular time of publication for each of the traditional media source programs that the viewer requested for publication. According to one embodiment of the invention, the viewer interacts with digital remote recorder 110 through an internet-enabled interface displayed at the viewer's network client 120.

At block 204, digital remote recorder 110 automatically captures and encodes the one or more traditional media source programs that the viewer requested for publication. Various mechanisms have been developed for capturing and encoding traditional media source programs. One such mechanism is presented in co-pending application, entitled "DISTRIBUTED PRODUCTION SYSTEM FOR DIGITALLY ENCODING INFORMATION", Ser. No. 09/499,961, and naming as inventors Martin Tobias, Beverley Kite, Mathews Brown, Eric Lindvall, Jeffrey Oberlander, Aaron Roberts, Anna Hansen, Greg Malley and Ken Suzuki, the contents of which is hereby included in their entirety by reference.

At block 206, digital remote recorder 110 stores the one or more streaming media programs on a device that is accessible over the network such as network server 115 of FIG. 1.

At block 208, digital remote recorder 110 determines whether the viewer has selected a scheduled time for publication of each of the one or more streaming media programs. If at block 208 digital remote recorder 110 determines that the viewer had not scheduled time for publication of each of the one or more streaming media programs, then at block 210, digital remote recorder 110 notifies the viewer that the streaming media programs that the viewer requested are ready for publication.

If at block 208 digital remote recorder 110 determines that the viewer has scheduled a particular time for publication of each of the one or more streaming media programs, then at block 212, digital remote recorder 110 publishes to the viewer at the scheduled time each of the streaming media programs that the viewer requested for publication. For example, at the scheduled time, the viewer accesses an electronic document over a network and selects a URL link that is associated with the streaming media program that the viewer requested for publication. In response network server 115 causes the selected streaming media program to be published to the viewer's network client 120.

Hardware Overview

Figure 3:
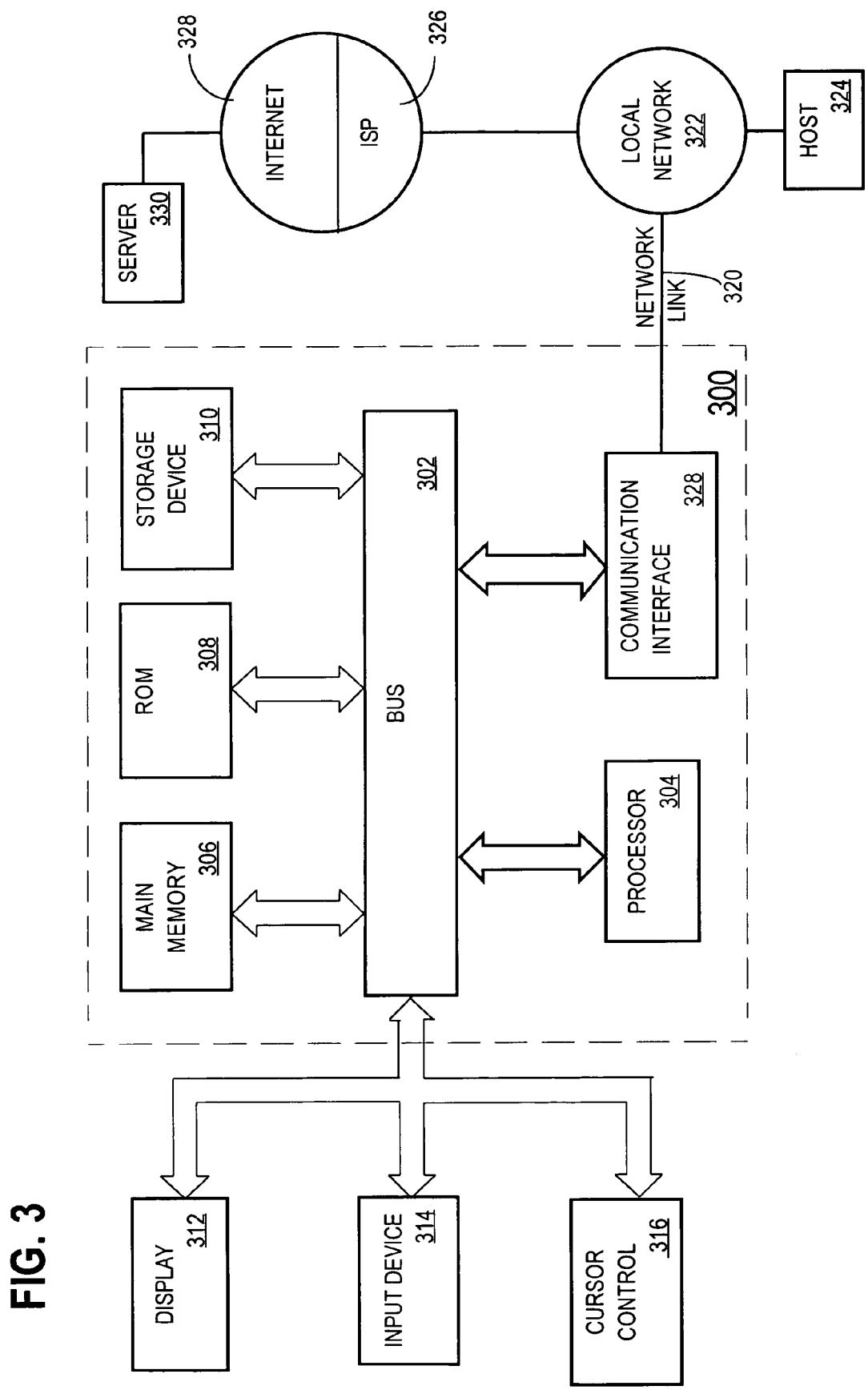
FIG. 3 is a block diagram of a computer system hardware arrangement upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for automatically recording and publishing traditional media source programs in streaming format. According to one embodiment of the invention, comprehensive remote servicing of media programs is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for automatically recording and publishing traditional media source programs in streaming format as described herein.

The received code may be executed by processor 304 as it is received, and/or stored in storage device 310, or other non-volatile storage for later execution. In this manner, computer system 300 may obtain application code in the form of a carrier wave.

Alternatives And Extensions

In describing certain embodiments of the invention, several drawing figures have been used for explanation purposes. However, the invention is not limited to any particular context as shown in the drawing figures. In particular, the invention is not limited to the context shown in the drawing figures, and the spirit and scope of the invention include other contexts and applications in which the recording and publication functions described herein are available to other mechanisms, methods, programs, and processes. For example, although only one network client, one remote digital recorder and one network server have been described for illustrative purposes, multiple like devices may be configured to perform the same functions. For example, a plurality of network clients may communicate with a plurality of digital remote recorders to capture and encode traditional media source programs into corresponding streaming media programs. These streaming media programs may be stored on one or more different network servers.

Further, although examples have been described in the context of streaming video media programs, embodiments of the invention are not limited to any particular encoding format, nor are the embodiments limited to video media. For example, in certain embodiments, a streaming audio media program in RealAudio format may be published to a listener. As another example, traditional media source programs may be encoded in a non-streaming format such as MPEG.

Thus, the specification and drawings are, accordingly, to be regarded in an illustrative rather than a restrictive sense.

In addition, in this disclosure, including in the claims, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps. Thus, embodiments of the invention are only limited by the following claims.

What is claimed is:

1. a method for automatically recording and publishing traditional media source programs over a network, the method comprising the computer-implemented steps of:

receiving from a network client that is connected to the network a request to record and publish one or more traditional media source programs in one or more encoding formats, the one or more traditional media source programs being broadcast from a traditional media source that is not generally receivable at a geographic location at which the network client resides;

in response to receiving the request, capturing the one or more traditional media source programs from the traditional media source that broadcasts the one or more traditional media source programs at a particular broadcast time to a broadcasting area of the traditional media source;

encoding the one or more traditional media source programs in the one or more encoding formats to produce one or more encoded media programs; and publishing, at a time different from the particular broadcast time, the one or more encoded media programs over the network to the network client located outside the broadcasting area of the traditional media source.

2. The method as recited in claim 1, further comprising:

causing a viewer interface to be displayed at the network client, wherein the viewer interface:

allows selection of the one or more traditional media source programs for encoding; and allows specification of publishing parameters;

wherein the step of publishing is performed based on said publishing parameters.

3. The method as recited in claim 2, wherein the specification of publishing parameters includes specifying a time of publication of each of the one or more encoded media programs to the network client.

4. The method as recited in claim 1, wherein the traditional media source is a satellite.

5. The method as recited in claim 1, wherein:

the step of receiving a request for publication of one or more traditional media source programs in one or more encoding formats includes the step of receiving a request for publication of the one or more traditional media source programs in one or more streaming media formats; and the step of encoding the one or more traditional media source programs in the one or more encoding formats includes the step of encoding the one or more traditional media source programs in the one or more streaming media formats.

6. The method as recited in claim 1, wherein:

the step of receiving a request for publication of one or more traditional media source programs in one or more encoding formats includes the step of receiving a request for publication of one or more traditional media source programs in one or more non-streaming media formats; and the step of encoding the one or more traditional media source programs in the one or more encoding formats includes the step of encoding the one or more traditional media source programs in the one or more non-streaming media formats.

7. The method as recited in claim 1, further comprising the step of notifying the network client that the one or more traditional media source programs have been encoded in the one or more encoding formats to produce one or more encoded media programs.

8. The method as recited in claim 7, wherein the step of notifying the network client includes the step of notifying the network client via an e-mail message.

9. The method as recited in claim 1, further comprising the step of sending an e-mail message to the network client, wherein the e-mail message includes a link which when selected initiates the transmission of one of the one or more encoded media programs to the network client.

10. The method as recited in claim 1, further comprising the step of sending an e-mail message to the network client, wherein the e-mail message includes a link which when selected causes a Web page to be displayed at the network client that includes controls that allow a user of the network client to initiate the transmission of one of the one or more encoded media programs to the network client.

11. The method as recited in claim 1, further comprising the step of adding a link to a Web page that is associated with the network client, wherein the link allows a user of the network client to initiate the transmission of one of the one or more encoded media programs to the network client.

12. A computer-readable medium storage medium storing one or more sequences of instructions for automatically recording and publishing traditional media source programs over a network, wherein execution of the one or more sequences of instructions by one or more processors cause the one or more processors to perform the steps of:

receiving from a network client that is connected to the network a request to record and publish one or more traditional media source programs in one or more encoding formats, the one or more traditional media source programs being broadcast from a traditional media source that is not generally receivable at a geographic location at which the network client resides;

in response to receiving the request, capturing the one or more traditional media source programs from the traditional media source that broadcasts the one or more traditional media source programs at a particular broadcast time to a broadcasting area of the traditional media source;

encoding the one or more traditional media source programs in the one or more encoding formats to produce one or more encoded media programs; and publishing, at a time different from the particular broadcast time, the one or more encoded media programs over the network to the network client located outside the broadcasting area of the traditional media source.

13. The computer-readable storage medium as recited in claim 12, further comprising instructions for performing the steps of:

causing a viewer interface to be displayed at the network client, wherein the viewer interface:

allows selection of the one or more traditional media source programs for encoding; and allows specification of publishing parameters;

wherein the step of publishing is performed based on the publishing parameters.

14. The computer-readable storage medium as recited in claim 13, wherein the specification of publishing parameters includes specifying a time of publication of each of the one or more encoded media programs to the network client.

15. The computer-readable storage medium as recited in claim 12, wherein the traditional media source is a satellite.

16. The computer-readable storage medium as recited in claim 12, wherein:

the step of receiving a request for publication of one or more traditional media source programs in one or more encoding formats includes the step of receiving a request for publication of one or more traditional media source programs in one or more streaming media formats; and the step of encoding the one or more traditional media source programs in the one or more encoding formats includes the step of encoding the one or more traditional media source programs in the one or more streaming media formats.

17. The computer-readable storage medium as recited in claim 12, wherein:
- the step of receiving a request for publication of one or more traditional media source programs in one or more encoding formats includes the step of receiving a request for publication of one or more traditional media source programs in one or more non-streaming media formats; and
- the step of encoding the one or more traditional media source programs in the one or more encoding formats includes the step of encoding the one or more traditional media source programs in the one or more non-streaming media formats.

18. The computer-readable storage medium as recited in claim 12, further comprising instructions for performing the step of notifying the network client that the one or more traditional media source programs have been encoded in the one or more encoding formats to produce one or more encoded media programs.

19. The computer-readable storage medium as recited in claim 18, wherein the step of notifying the network client includes the step of notifying the network client via an e-mail message.

20. The computer-readable storage medium as recited in claim 12, further comprising instructions for performing the step of sending an e-mail message to the network client, wherein the e-mail message includes a link which when selected initiates the transmission of one of the one or more encoded media programs to said network client.

21. The computer-readable storage medium as recited in claim 12, further comprising instructions for performing the step of sending an e-mail message to the network client, wherein the e-mail message includes a link which when selected causes a Web page to be displayed at the network client that includes controls that allow a user of the network client to initiate the transmission of one of the one or more encoded media programs to said network client.

22. The computer-readable storage medium as recited in claim 12, further comprising instructions for performing the step of adding a link to a Web page that is associated with the network client, wherein the link allows a user of the network client to initiates the transmission of one of the one or more encoded media programs to the network client.

23. A system for automatically recording and publishing traditional media source programs in digital format over a network, the system comprising:
- a digital remote recorder, wherein the digital remote recorder is configured to received encoding requests from a network client that is connected to the network to record and encode one or more traditional media source programs, the one or more traditional media source programs being broadcast from a traditional media source that is not generally receivable at a geographic location at which the network client resides, and
- to automatically capture and encode the traditional media source programs from the traditional media source, which are broadcast at a particular broadcast time to a broadcasting area of the traditional media source, into corresponding one or more encoded media programs based on the encoding requests; and
- a network server that is connected to the digital remote recorder, wherein the network server is configured to store the one or more encoded media programs, and to publish the one or more encoded media programs to the network client located outside the broadcasting area of the traditional media source.

* * * * *